(12) United States Patent
Wieczorek et al.

(10) Patent No.: US 6,962,385 B2
(45) Date of Patent: Nov. 8, 2005

(54) SLIDING VISOR

(75) Inventors: Joseph P. Wieczorek, Lake Orion, MI (US); Leslie R. Hinds, Oxford, MI (US); Richard T. Bogdanski, Canton, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 10/686,473

(22) Filed: Oct. 15, 2003

(65) Prior Publication Data

US 2005/0082868 A1 Apr. 21, 2005

(51) Int. Cl.⁷ ................................................ B60J 3/02
(52) U.S. Cl. .............................. 296/97.11; 296/97.13
(58) Field of Search .............................. 296/97.1, 97.9, 296/97.11, 97.12, 97.13

(56) References Cited

U.S. PATENT DOCUMENTS

| 4,521,046 A | 6/1985 | Foggini |
| 4,925,233 A | 5/1990 | Clark |
| 4,998,765 A | 3/1991 | Van Order et al. |
| 5,161,850 A | 11/1992 | Redder et al. |
| 5,409,285 A | 4/1995 | Snyder et al. |
| 5,645,308 A | 7/1997 | Fink |
| 5,653,490 A | 8/1997 | Fink et al. |
| 6,174,019 B1 | 1/2001 | Collet et al. |
| 6,692,059 B1 * | 2/2004 | Mills ........................ 296/97.1 |
| 2001/0024048 A1 * | 9/2001 | Hobson et al. ............ 296/97.1 |
| 2001/0050493 A1 * | 12/2001 | Welter ....................... 296/97.1 |
| 2004/0145209 A1 * | 7/2004 | Peterson et al. ......... 296/97.11 |

* cited by examiner

*Primary Examiner*—Jason Morrow
(74) *Attorney, Agent, or Firm*—Raggio & Dinnin, P.C.

(57) ABSTRACT

A sun visor for a motor vehicle is provided, and includes first and second visor body shells. The shells define a retaining channel for a slider on a visor pivot rod, and may be engaged and closed about the slider, capturing the pivot rod and slider in a single assembly step. In another aspect, a sun visor is provided having a combination slider and detent slidably supported in channels molded into first and second visor shells. A support arm is provided and is laterally offset from the combination slider and detent and is slidably relative thereto.

27 Claims, 3 Drawing Sheets

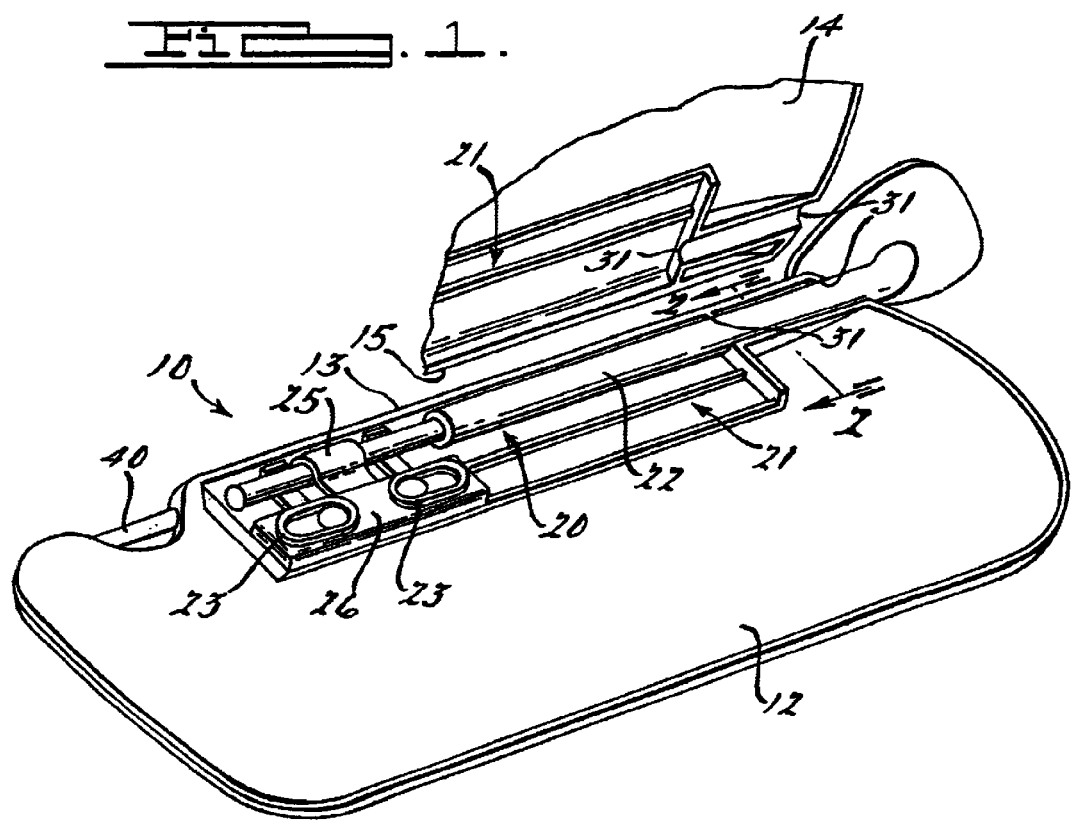
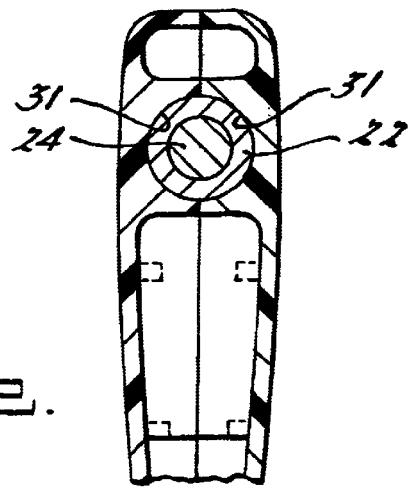

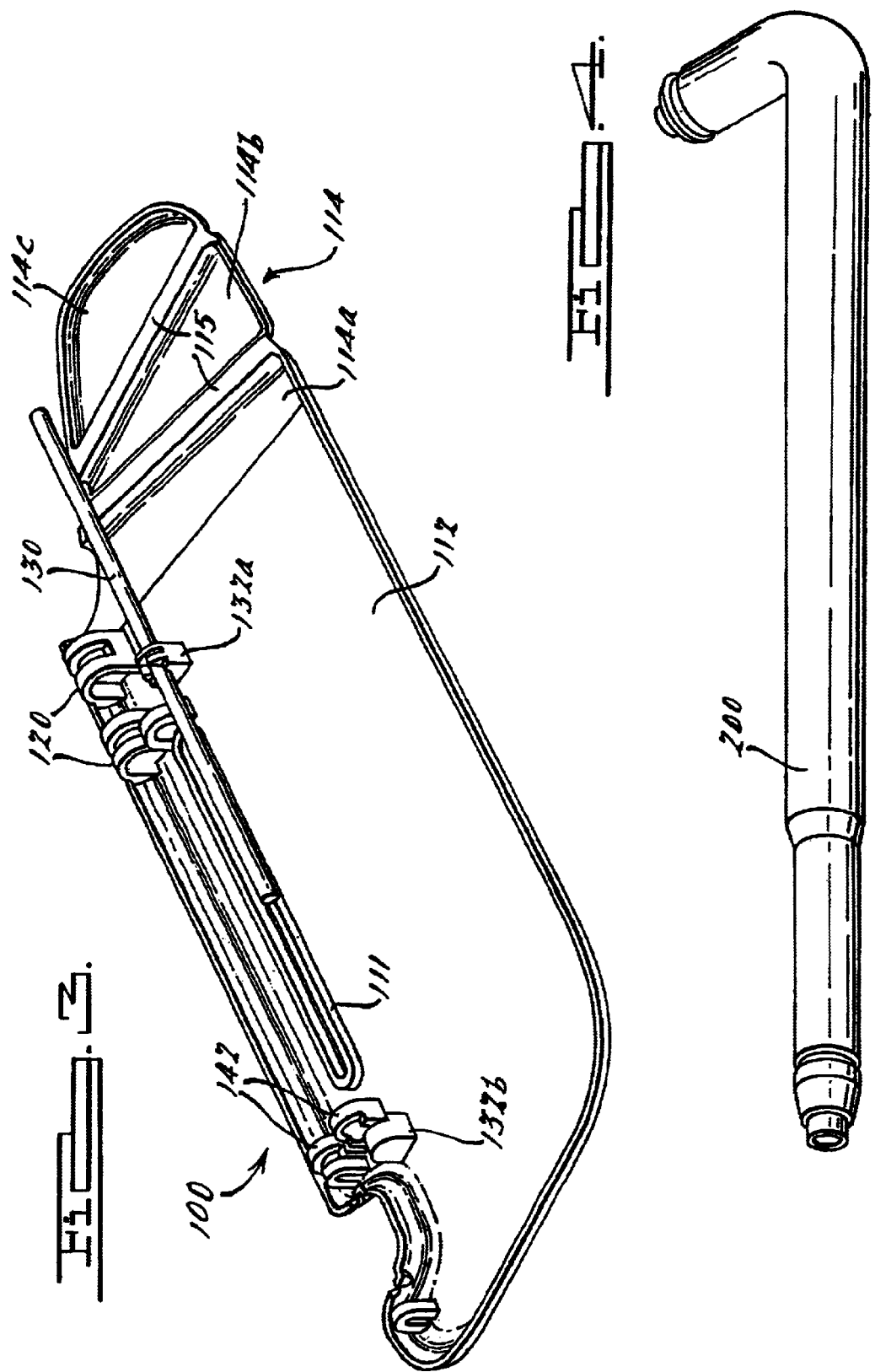

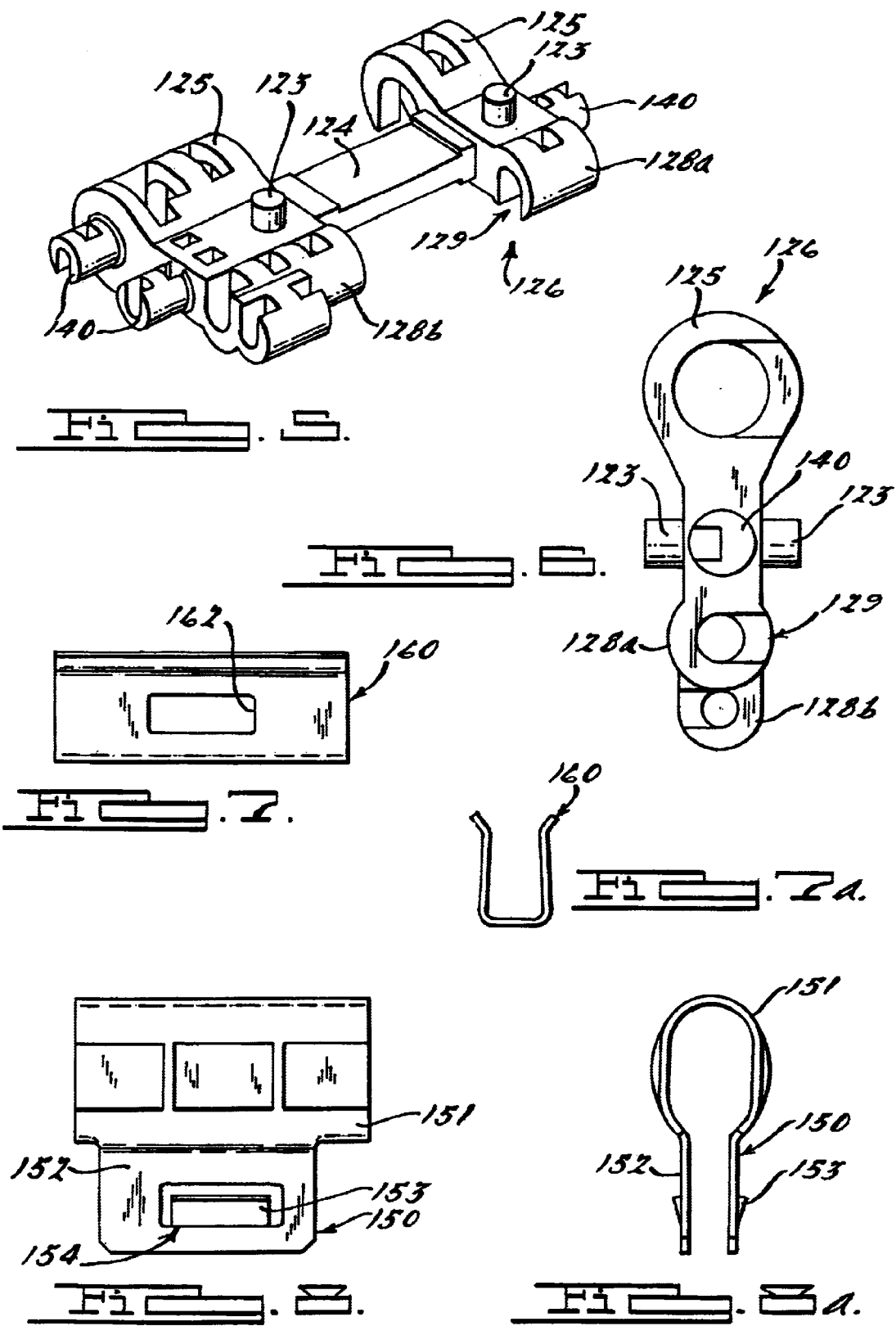

SLIDING VISOR

TECHNICAL FIELD

The present invention relates generally to a movable sun visor for interior use in a vehicle, and more particularly to such a sun visor wherein the visor body includes two visor body halves or shells adapted to close about and slidably retain a slider and detent assembly attached to a pivot rod.

BACKGROUND OF THE INVENTION

Sun visors are well known and widely used, and a great many designs have been successfully employed in vehicles over the years. Engineers have developed a variety of elegant ways by which visor bodies and other interior components may be constructed and mounted in a vehicle. Advances in design, however, can often add complexity to the manufacturing processes for interior components. There has been and continues to be a premium in the automotive industry on cost savings, and improvements in the efficiency and speed of manufacturing processes are often welcomed by the industry. An area of particular focus in automobile technology has been reducing the number and complexity of steps required to assemble interior components such as visors.

While manufacturing simplicity continues to drive innovations in the industry, loss of quality and performance in manufactured interior components for the sake of facilitating production is seldom, if ever acceptable. There is a substantial body of art relating to the specific structure of the visor to provide a strong, lightweight construction that matches or compliments the vehicle interior trim in a cost effective manner. Of particular interest has been the "clamshell" type construction which involves the molding of two shell pieces or clamshell halves which are joined to form the visor. In one typical clamshell design, the visor halves are formed as a single piece attached along a longitudinal edge, and then folded to form the visor body. The exterior surface can be molded to provide a suitable visor surface, or a desired covering can be added in a variety of ways.

The clamshell design allows the visor body to be constructed relatively quickly and easily, however, the various components that are attached to the visor clamshell halves must in some cases be incorporated with several assembly steps prior to securing the clamshell halves together. For example, several known designs require insertion of additional mounting or journaling pieces for retention of the visor pivot rod within the visor body. The construction of visors having such a design is relatively time-intensive. Moreover, the various slides, sleeves, retainers, etc. utilized in the construction can add significant expense and weight to the overall visor and increase the number of components.

Eliminating parts can reduce the expense of manufacturing and constructing the visor. Decreasing size and weight, however, can be accompanied by decreases in strength. Where rotatable visors are concerned, in particular, flimsy construction of the visor core and slider components can be insufficient to withstand repeated torque actions on the visor shell itself, in some cases causing dislodging or breaking of the pieces. It is thus desirable to provide a visor that is light weight, easy to manufacture and uses relatively few components, yet utilizes a design imparting significant durability to withstand heavy and repeated use.

SUMMARY OF THE INVENTION

In one aspect, the present invention provides a sun visor for a motor vehicle. The sun visor preferably includes a pivot rod, and a slider attached to the pivot rod. A first shell having a first longitudinal channel portion integrally molded therein is also preferably provided and a second shell preferably having a second longitudinal channel portion integrally molded therein. The shells are engageable to form an elongate visor body, wherein engagement of the shells preferably substantially aligns the first and second longitudinal channel portions about the slider, the shells slidably retaining the slider therebetween.

In another aspect, the present invention provides a sun visor for a motor vehicle including a pivot rod and slider attached to the pivot rod. A first shell is provided preferably having a longitudinal channel portion integrally molded therein for slidably supporting the slider, and further preferably having a support arm fixed to the shell and slidably received by said slider.

BRIEF DESCRIPTION OF THE DRAWINGS

FIG. 1 is an unassembled visor according to a preferred embodiment of the present invention;

FIG. 2 is a cross section of a visor taken through line A—A of FIG. 1;

FIG. 3 is a visor clam shell according to a preferred embodiment of the present invention;

FIG. 4 is a pivot rod suitable for use with the slider of FIG. 3;

FIG. 5 is an elevational view of a slider member according to another preferred embodiment of the present invention;

FIG. 6 is an end view of a the slider member of FIG. 5;

FIGS. 7 and 7a are side and end views of a detent retainer;

FIGS. 8 and 8a are side and end views of a detent clip.

DETAILED DESCRIPTION OF PREFERRED EMBODIMENTS

Referring to FIGS. 1 and 2, there is shown a visor 10 according to preferred embodiment of the present invention. FIG. 2 is a cross section taken at line A—A through FIG. 1. In one aspect, the present invention broadly provides a clamshell-type vehicle sun visor having a pivot rod mounted to a combination slider and detent, wherein the pivot rod and slider-detent is slidably captured during assembly with the single step of attaching visor shell portions together. The slider-detent thus rides in the visor body itself rather than a separate carrier, and is preferably retained between surfaces and/or features such as channels molded integrally with the shell portions. Similarly, the pivot rod rides in the visor body, and a separate bracket, bezel or similar piece is not necessary to support the pivot rod. Related aspects of the present invention include methods for manufacturing a sun visor, also described herein.

In the preferred embodiment illustrated in FIG. 1, the visor 10 includes first and second shell halves or shells 12 and 14, engageable to form an elongate visor body. Various molded features may be included on each shell 12 and 14 to facilitate engagement of the shells. For example, a series of complementary structures (not shown) can be formed on the respective visor shells that allow a snap-fit therebetween. In one embodiment (not shown), shells 12 and 14 are formed having integral or connected longitudinal peripheral edges 13 and 15, respectively. Other embodiments are contemplated in which shells 12 and 14 are formed as separate, unconnected members. Although connected shells are preferred, visor 10 has been illustrated in FIG. 1 as having separate, unconnected shells for clarity and ease of description. Visor 10 further preferably includes a pivot rod assembly 20 that comprises a pivot rod 22 and a pivot rod slider 26. Visor 10 is preferably formed such that the shells 12 and 14 can be closed about pivot rod 22, capturing rod 22 therebetween in a single assembly step. Preferably, slider 26 is also slidably captured by the closure or engagement of the shells 12 and 14, slidably securing slider 26 between the shells 12 and 14 without the need for installation of an internal slide member, retainer or similar mechanism for mounting pivot rod assembly 20. All the component parts of visor 10 are manufactured from known materials and by known processes.

In a preferred embodiment, shells 12 and 14 are formed by injection molding plastic material in a conventional manner. For example, the shells may be formed from a molded polyethylene, or by some other suitable method and/or material. First and second shells 12 and 14 preferably each include arcuate retaining surfaces 31. There are various contemplated designs for arcuate surfaces 31, described herein, although other embodiments and variations in design are contemplated. The first preferred embodiment, shown in FIG. 1, includes one or more arcuate retaining surfaces 31 on each shell that comprise relatively narrow arcuate ledges 31 extending outwardly from, and substantially normal to, the visor shell. A second preferred embodiment (not shown) could include "arcuate retaining surfaces" that are elongate, trough-shaped surfaces extending parallel to an edge of the visor shell and defining a portion of a cylindrical wall. It should further be appreciated that the present invention encompasses designs wherein the arcuate retaining surfaces vary in dimension between longer, trough-shaped features and the narrow arcuate ledges shown in FIG. 1. Referring also to FIG. 2, the cross-section of the arcuate retaining surfaces 31 preferably defines an at least partially circular cross-section, preferably complementary to the shape of pivot rod 22.

In the FIG. 1 embodiment, the arcuate ledges 31 are preferably positioned substantially in opposition about the pivot rod 22 when the visor shells 12 and 14 are engaged. For example, a pair of arcuate ledges might be molded into each shell half, and the ledges brought substantially into aligned opposition about the pivot rod 22 as the shells 12 and 14 are brought together and engaged. When pivot rod 22 is placed against one or more ledges 31 on one of shells 12 and 14, the two visor shells 12 and 14 can be brought together to capture pivot rod 22 between ledges 31 on the opposing shell halves. It should be appreciated that although a plurality of ledges is preferred, a single ledge on each shell half 12 and 14 might be used without departing from the scope of the present invention. In one preferred embodiment, the shell halves 12 and 14 and/or pivot rod 22 are formed from a polymeric material having sufficient lubricity that pivot rod 22 is rotatably journaled by ledges 31. Shell halves 12 and 14 might also be designed such that they only loosely capture pivot rod 22 and thus allow rotation thereof relative to pivot rod 22. Ledges 31 are preferably molded integrally with shell halves 12 and 14, but might also be formed as separate arcuate members attachable to shells 12 and 14 prior to assembly. Still further, although the arcuate surfaces are preferably formed in shells 12 and 14 in the molding step, they might be formed by post-molding modification of the molded shell halves if desired.

In FIG. 1, numeral 21 identifies a channel portion within which slider 26 or a portion of slider 26 preferably rides. Slider 26 is preferably substantially planar, and preferably includes a plurality of locating projections 23 that are fitted within channel portion 21 during visor assembly. In a preferred embodiment, slider 26 is plastic, and the locating projections 23 are integrally molded therewith, although it should be appreciated that alternative designs are possible wherein fasteners or some other suitable type of projections are attached to slider 26 and fit within the channel portion 21. A clip detent assembly 25 comprising a plurality of opposed clip members is preferably included as a part of slider 26, and facilitates lockable rotation of pivot rod 22 relative thereto via a flat (not shown) on pivot rod 22. It should be appreciated that channels 21 may be formed in one or both of shells 12 and 14. Likewise, the locating projections 23 may be included on either or both sides of slider 26, whereby they are engaged with channel(s) 21. In a preferred embodiment, each channel(s) 21 comprises a pair of thin parallel walls that project upwardly from a main substantially planar portion of the visor shells 12 and 14, as shown. It should further be appreciated that although it is preferred, it is not critical to provide channels that are complementary to or otherwise adapted for engaging locating projections 23 on slider 26. The shells 12 and 14 may be molded such that they have a channel or channels that capture the entire slider 26, rather than just capturing locating projections thereon. In such an embodiment, the visor shells 12 and 14 would be engaged and attached, thereby aligning the channel(s) about the slider 26. Similar to the description with respect to arcuate surfaces 31, engagement of shells 12 and 14 preferably retains slider 26 therebetween in a single assembly step. A conventional clip rod 40 is preferably provided for snap-fitting visor 10 with a holder in the vehicle headliner.

In relation to the preferred constructed visors described above, the present invention includes a method for manufacturing a visor. In one embodiment, the method preferably includes the step of molding first and second visor shells 12 and 14, wherein each of the shells includes an integrally molded channel 21 on an inner side. The method further preferably includes the step of aligning a slider 26 on a pivot rod 22 with the channel(s). The method further preferably includes the step of aligning and attaching the first and second shell portions 12 and 14 such that the channels 21 are substantially opposed, the channels thereby slidably retaining slider 26 that is disposed between the shells 12 and 14.

As the shells 12 and 14 are engaged, the arcuate retaining surfaces 31 are also preferably positioned such that they are substantially opposed about pivot rod 22. As used herein, the term "substantially opposed" should be understood to encompass designs wherein arcuate ledges of one shell half engage the pivot rod 22 substantially opposite the arcuate ledges of the other shell half, as well as designs wherein the arcuate ledges on a first half are at staggered positions relative to the arcuate ledges on the other half. For example, the ledges might be positioned in alternating locations rather than opposite positions.

The present invention allows a visor to be assembled in fewer steps than many earlier visor designs. By eliminating a separate carrier for the pivot rod and slider, and instead carrying the pivot rod and slider between the visor shells, the present design reduces the number of components that must be incorporated in the visor. Similarly, the slider rides within the visor body itself, and so also does not require a separate carrier. When the visor shells are fully assembled into a visor body, the visor body may be rotated or slid as a unit relative to pivot rod 22. A vehicle occupant may manually manipulate visor 10, pulling it away from the visor mount in the vehicle headliner (not shown) to draw visor 10 along slider 26, which remains slidably held between the shells 12 and 14. Similarly, rotational force can be exerted on the exterior of visor 10 by an occupant to adjust the angle of visor 10 in the vehicle relative to, for example, intrusive sunlight. Further still, combining a detent with a laterally offset slider (relative to the pivot rod itself) imparts a greater mechanical advantage with respect to rotation of the visor relative to the pivot rod than in designs wherein the slider is not laterally offset from the detent to a similar degree. Accordingly, a relatively more robust detent may be used without rendering rotation of the visor body relative to the pivot rod unduly difficult. The preferably laterally offset design further allows a relatively thin visor body to be formed, without the necessity of a bulky detent and slider mechanism positioned about the pivot rod.

Turning now to FIG. 3, there is shown a visor clam shell 100 according to another preferred embodiment of the present invention. Shell 100 includes a visor body 112, preferably a molded plastic, having a bendable ear 114. Ear 114 preferably comprises a plurality of ear portions 114a–c, connected by relatively thin, bendable regions of plastic 115, that can serve as joints between the adjacent ear portions. Thus, when shell 112, incorporated in a visor, is pushed upwardly against the vehicle headliner (not shown), the flexible nature of regions 115 allows ear portion 114 to conform to a bended contour of the headliner. Shell 112 further preferably includes a plurality of retainer hoops 120, adapted to receive a visor pivot rod, for example, the pivot rod 200 shown in FIG. 4, inserted therethrough. Hoops 120 preferably are positioned about pivot rod 200 relatively loosely, such that pivot rod 120 can be rotated and slid relative thereto. In a preferred embodiment, visor shell 112 is incorporated into a visor (not shown) having two similar shell halves, visor shell 112 being a first shell, and having hoops 120. The second shell (not shown) is preferably formed without such retainer hoops. Visor shell 112 further preferably includes a support arm 130 mounted in a set of mounting brackets 132a and 132b. Support arm 130 preferably snaps into a first bracket 132a, and is then preferably slid into engagement with a second bracket 132b. Alternative embodiments are contemplated wherein support arm 130 is integrally molded with shell 112 rather than formed as a separate member and attached thereto.

In a preferred embodiment, shell 112 includes a channel 111 integrally molded therein. FIG. 5 illustrates a slider member 126 preferably including a plurality of locating projections 123, adapted to slidably support slider 126 relative to channel 111. In a preferred embodiment, slider 126 comprises two locating projections 123 on both sides thereof, as illustrated in FIG. 6; however, alternative embodiments are contemplated (not shown) wherein a greater or lesser number of locating projections are used. It is generally preferred, however, to use a plurality of spaced locating projections in all the presently disclosed embodiments to assist in providing relative support between the visor and pivot rod via an interaction between channel 111 and the supporting protrusions sliding therein. Slider 126 is preferably attached to a pivot rod such as pivot rod 200 of FIG. 3 via a plurality of journals 125, which rotatably retain pivot rod 200. In a preferred embodiment, pivot rod 200 is coated with a relatively low-friction plastic such as polytetrafluoroethylene to facilitate rotating relative to journals 125, as well as sliding and rotating relative to hoops 120. Slider 126 is further preferably equipped with a plurality of supporting extensions 128a and 128b, which slidably engage support arm 130. A first supporting extension 128a is preferably an arcuate member that is positioned over support arm 130, further including an open side 129. A second supporting extension 128b preferably includes an aperture (not shown) into which support arm 130 can be slid.

End protrusions 140 are also preferably provided at opposite ends of slider 126, and are preferably received in substantially mating stops 142 positioned at opposite ends of channel 111 of visor shell 112. Thus, as slider 126 slides back and forth relative to shell 112, stops 142 limit the travel of slider 126, and the mating engagement of stops 142 with end protrusions 140 provides support and rigidity to the visor when slider 126 is positioned at opposite ends of its travel limits relative to the visor within which it rides. Further, engagement of stops 142 with end protrusions 140 provides for relatively solid leverage, allowing the visor to be rotated relative to slider 126, overcoming the detent force (discussed below) relatively easily.

Referring to FIGS. 7, 7a and 8, 8a, there are shown component pieces of a detent assembly preferably used with the present invention. FIGS. 8 and 8a show side and end views of a detent clip 150. Clip 150 is preferably a bent metallic piece having a rounded upper portion 151 and a substantially straight lower portion 152 comprising two substantially identical legs. A tab 153 is preferably formed integrally with each of the legs, and joined thereto along an attachment edge 154. In a preferred embodiment, tab 153 is bent slightly outwardly from the plane of the leg 153 to which it attached. FIGS. 7 and 7a, illustrate side and end views, respectively, of a detent retainer 160 adapted to engage with clip 150. Detent retainer 160 preferably includes a window 162, allowing engagement with tab 153 when retainer 160 and clip 150 are engaged. In a preferred embodiment, a plastic detent (not shown), having a shape substantially conforming to an inside of clip 153, is placed therein, and retainer 160 slid into engagement therewith. A pivot rod, for example, pivot rod 200 of FIG. 4 is slid into engagement with the plastic detent. Compressive forces are provided via the plastic detent to the pivot rod, provided by a clamping of clip 150 about the detent, secured by engagement of clip 150 with retainer 160. Prior to engaging clip 150 and retainer 160 (with the detent and pivot rod therein), clip 150 is positioned about a neck 124 of slider 126. Thus, engagement of clip 150 and retainer 160 preferably secures the entire detent assembly, slider and pivot rod together. Support arm 130 may be slid into engagement with slider 126 prior to completion of the detent assembly, or subsequently thereto.

The present description is for illustrative purposes only, and should not be construed to limit the present invention in any way. Thus, those skilled in the art will appreciate that various modifications might be made to the presently disclosed embodiments without departing from the scope and spirit of the present invention, which is defined in terms of the claims set forth below. Other aspects, features and advantages will be apparent upon an examination of the attached drawing Figures and appended claims.

What is claimed is:

1. A sun visor for a motor vehicle comprising:
   a pivot rod adapted to attach with a vehicle headliner;
   a first shell having at least one arcuate surface on an interior side;
   a second shell having at least one arcuate surface on an interior side;
   said shells being engageable to form an elongate visor body;
   wherein an engagement of said shells substantially aligns said arcuate surfaces about said pivot rod, said surfaces thereby rotatably and slidably retaining said pivot rod with said visor body.

2. The sun visor of claim 1 wherein said arcuate retaining surfaces are arcuate ledges formed integrally with said shell portions.

3. The sun visor of claim 2 further comprising first and second arcuate ledges on said first and second shell portions, wherein said arcuate ledges are positioned substantially opposite one another about said pivot rod when said shells are engaged.

4. The sun visor of claim 1 wherein said arcuate retaining surfaces are each substantially partially cylindrical and extend in a direction substantially parallel to a longitudinal peripheral edge of said visor body.

5. The sun visor of claim 1 wherein the first and second shells are attached along a longitudinal peripheral edge, said shells being engageable by a folding along said edge thereby aligning said arcuate surfaces about said pivot rod.

6. The sun visor of claim 1 further comprising:
a combination slider and detent attached to said pivot rod, said slider being laterally offset from said pivot rod; and
channels integrally molded in each of said first and second shells and adapted to slidably retain the slider therebetween.

7. A sun visor for a motor vehicle comprising:
a pivot rod;
a combination slider and detent attached to said pivot rod;
a first shell having a first longitudinal channel integrally molded therein;
a second shell having a second longitudinal channel integrally molded therein;
said shells being engageable to form an elongate visor body;
wherein engagement of said shells substantially aligns said first and second longitudinal channels about portions of said slider, said shells slidably retaining said slider therebetween, said slider comprises a plurality of locating projections extending from opposite sides of said planar body extending into said channels.

8. The sun visor of claim 7 further comprising arcuate retaining surfaces integrally formed with said first and second shell portions, wherein engagement of said shell portions aligns said arcuate retaining surfaces about said pivot rod.

9. The sun visor of claim 7 wherein said slider comprises a substantially planar body having at least one locating projection extending in a direction substantially normal to the planar body.

10. The sun visor of claim 7 wherein said longitudinal channels comprise dual parallel wall portions projecting from said shells and adapted to slidably retain said plurality of locating projections.

11. The sun visor of claim 7 wherein said locating projections each comprise substantially linear edges along opposite sides thereof, said linear edges aligning substantially flush with said wall portions when said shells are engaged.

12. The sun visor of claim 7 wherein said combination slider and detent comprises:
a plurality of clip members opposed about said pivot rod; and
a substantially planar slider body attached to said clip members, and having a plurality of locating projections extending in a direction substantially normal to an orientation of said planar body, said locating projections slidable in said channels when said shells are engaged.

13. A method of manufacturing a sun visor comprising the steps of:
molding first and second visor shells, wherein the visor shells are adapted to fit together to form an elongate visor body, wherein at least one of the shells includes a molded longitudinal channel on an interior side, each of the shells includes a channel formed from thin walls projecting substantially normal to an interior surface of the shell, wherein said channels are adapted to engage locating projections on said slider;
aligning a slider attached to a pivot rod with the at least one shell having the channel, wherein at least portions of the slider are positioned in the channel;
attaching the shells, thereby aligning the first and second shells such that the slider is slidably retained between the shells and at least portions of the slider are maintained within the channel during a sliding of the slider;
wherein the slider is secured between the visor shells in a single assembly step, and is thereby slidably retained by said visor shells.

14. The method of claim 13 wherein the step of molding first and second visor shells comprises molding the shells such that at least one of the shells includes a channel formed from thin walls projecting substantially normal to an interior surface of the shell.

15. The method of claim 13 wherein the step of molding first and second visor shells comprises:
molding the first and second shells to include arcuate retaining surfaces having partially circular cross sections, wherein the arcuate retaining surfaces rotatably and slidably retain the pivot rod.

16. A sun visor manufactured according to the method of claim 13.

17. The method of claim 13 wherein the molding step further comprises molding first and second visor shells attached along a longitudinal peripheral edge.

18. The method of claim 13 wherein the molding step further comprises molding first and second brackets laterally offset from the channel adapted to receive a support arm.

19. A sun visor for a motor vehicle comprising:
a first visor shell having a channel;
a second visor shell engageable with said first visor shell to form a hollow elongate visor body;
a slider positioned in said visor body, said slider comprising a plurality of supporting protrusions slidably engaging said channel;
a detent assembly attached to said slider;
a support arm offset from said channel and slidably engaging said slider.

20. The sun visor of claim 19 wherein said first visor shell comprises at least one slop; and
said slider comprises at least one end protrusion substantially mating with said at least one stop.

21. The sun visor of claim 20 further comprising at least two stops at different lateral positions relative to a sliding direction of said slider, each adapted to receive end protrusions on said slider, thereby facilitating rotational adjustment of said visor body relative to said slider.

22. The sun visor of claim 19 wherein said second visor shell comprises a channel; and
said slider comprises a plurality of supporting protrusions extending from opposite sides thereof, said supporting protrusions slidably engaging channels in the first and second visor shells.

23. The sun visor of claim 19 wherein said first visor shell comprises at least one hoop support adapted to slidably and rotatably journal a pivot rod.

24. The sun visor of claim 19 wherein said support arm comprises a substantially cylindrical elongate member received in mounting brackets on one of said first or second visor shells.

25. A sun visor for a motor vehicle comprising:
- a first molded visor shell having a plurality of hoop supports;
- a second molded visor shell attachable to said first visor shell to form an elongate hollow visor body;
- a pivot rod rotatably and slidably journaled in said hoop supports;
- a combination slider and detent attached at an end of said pivot rod and rotatable relative thereto, said combination slider and detent comprising a plurality of supporting protrusions;
- a first channel formed integrally with said first visor shell;
- a second channel formed integrally with said second visor shell;
- wherein an attachment of said first and second visor shells orients said first and second channels substantially in opposition about said combination slider and detent, said channels thereby slidably engaging said supporting protrusions, an engagement therebetween substantially preventing displacement of said visor relative to said slider in a direction transverse to a sliding direction.

26. The sun visor of claim 25 further comprising a support arm attached to an inside of one of said first and second shells and slidably engaging said combination slider and detent.

27. The sun visor of claim 26 wherein said combination slider and detent comprises a slider having a plurality of journals rotatably retaining said pivot rod and a plurality of supporting extensions slidably engaging said support arm.

* * * * *